Patented Jan. 19, 1954

2,666,781

UNITED STATES PATENT OFFICE 2,666,781

USE OF METHYLAL TO PREVENT EMULSIONS IN ESTERS DURING THE AQUEOUS WASH

Ian A. M. Ford, Quinton, Birmingham, England, assignor to Standard Oil Development Company, a corporation of Delaware No Drawing. Application January 30, 1952, Serial No. 269,107

Claims priority, application Great Britain February 23, 1951

6 Claims. (Cl. 260—468)

The crude products of the esterification of carboxylic acids with alcohols normally contain residual acids which constitute undesirable impurities. The obvious way of removing these impurities is to wash the ester with an aqueous alkali and then wash the ester with water in order to remove the residual alkali. However, when the acid is of the type which forms an emulsifying agent with alkali, emulsions are formed and it becomes difficult or even impossible to separate them from the ester. The difficulty can be considerably reduced by mixing an organic solvent with the crude ester, subjecting the mixture to the washing process, and subsequently removing the solvent by vacuum treatment or otherwise. However, even then the rate at which the washing liquors (alkali or water) will separate from the ester is still very low.

The organic solvents commonly used for the purpose described include benzene, petroleum spirit and isopropyl alcohol. According to this invention, methylal (methylene dimethyl ether, $CH_2(OCH_3)_2$) is used instead, and is found to be superior to any other common solvent, rendering the washing with alkali feasible in large-scale production of purified esters. The complete washing process consists in washing with alkali one or more times and then twice or more with water, as the alkali compounds formed in the alkali washing and any residual alkali are not adequately removed by a single water wash.

Sodium carbonate is the preferred alkali, and concentrations of between 7.5 and 10% w.:v. give the best results. Concentrations of 5% are usable but inconveniently low, and with more than 10% there is a tendency for the sodium carbonate to be thrown out of solution.

In carrying out the invention, the preferred range of proportions is from ¾ to 2 volumes of methylal per volume of ester. In practice, the use of approximately equal volumes is satisfactory. Either pure or commercial methylal (containing some 8% of methanol) may be used.

The washing is preferably carried out at a temperature between 10° and 30° C. with 20° to 25° C. as the preferred range. Temperatures above 30° C. are inconvenient due to the low boiling point (43° C.) of methylal, while at temperatures much below 20° C. the tendency for sodium carbonate to be thrown out of solution is substantial.

The extent of the improvement is shown by the following examples:

Example 1

One volume of crude isopropyl oleate having an acidity equivalent to 8.4 mg. KOH per gram was washed by shaking with an equal volume of 5% w.:v. aqueous $Na_2CO_3$, first alone and then together with one volume of a solvent, three different solvents being used, namely, benzene, isopropyl alcohol and methylal. After shaking the mixed liquid was allowed to stand and the time taken for it to separate into an aqueous layer and an oil layer was measured. In the experiments in which isopropyl alcohol and methylal were used, the aqueous layer was removed and the oil layer was then washed twice, one half volume of water being used each time; again the time taken for the mixture to separate into aqueous and oil layers was measured, and the acidity of the final oil layer (in mg. KOH per gram) was also measured. The results were as follows:

| Solvent | Soda wash | Time of separation for— | | |
|---|---|---|---|---|
| | | 1st water wash | 2nd water wash | Final acidity |
| None | Several hours | | | |
| Benzene | More than 5½ hours | | | |
| Isopropyl alcohol | 6 minutes | 5 minutes | 12 minutes | 0.02 |
| Methylal | 3 minutes | 2½ minutes | 4 minutes | 0.09 |

The improvement in the time of separation brought about with the use of methylal is clear from these figures. Although the final acidity was reduced to a lower figure with the use of isopropyl alcohol, the figure in each case was very low in comparison with the initial figure, and the ester can be regarded as satisfactorily purified in each case, since the final acidity was always less than the equivalent of 0.1 mg. KOH per gram.

Example 2

An ester prepared from 2 ethyl-hexanol and stearic acid, having an initial acidity of 1.1 mg. KOH per gram, was similarly treated, with the following results:

| Solvent | Soda wash | Time of separation for— | | |
|---|---|---|---|---|
| | | 1st water wash | 2nd water wash | Final acidity |
| Benzene (2 vols.) | More than 17 hours | 7 minutes | 10 minutes | 0.07 |
| Isopropyl alcohol (2 vols.) | 4 hours | 15 minutes | 40 minutes | 0.02 |
| Methylal (2 vols.) | 25 mins | 2 minutes | 6 minutes | 0.05 |

Example 3

A crude di-ethylhexyl-sebacate having an initial acidity equal to 3.4 mg. KOH per gram was treated as in Example 1, with the following result:

| Solvent | Soda wash | Time for separation of— | | | Final acidity |
|---|---|---|---|---|---|
| | | 1st water wash | 2nd water wash | | |
| None | More than 24 hours | | | | |
| Benzene | do | | | | |
| Acetone | 11 mins | More than 2 hours | | | |
| Isopropyl alcohol | 12½ mins | 12 minutes | 11 minutes | | 0.02 |
| Methylal | 10 mins | 3 minutes | 2 minutes | | 0.02 |

A further type of ester whose emulsion-forming tendencies are such as to make them particularly suitable for treatment by the process of the present invention, is the type of complex ester currently coming into use as synthetic lubricants.

Such complex esters are saturated products derived from aliphatic glycols or polyglycols, dibasic aliphatic acids and monobasic aliphatic acids or alcohols, preferably the latter. Open chain hydrocarbon derivatives are preferred, the two bifunctional components (glycol and dibasic acid) forming a chain of controlled length, the reactive ends of which are neutralised with the monofunctional component (acid or alcohol).

This class of compound which may be generally represented by the formula:

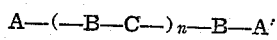

$$A-(-B-C-)_n-B-A'$$

where B and C represent glycol and dibasic acid residues or vice versa, $n$ is an integer, preferably small, and A is the appropriate monofunctional group, may be illustrated by a preferred embodiment in which the complex ester has the general formula:

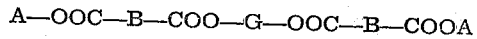

$$A-OOC-B-COO-G-OOC-B-COOA$$

in which A represents a monohydric alcohol residue, B a dibasic acid residue, and G a glycol and polyglycol residue. Esters of this type may advantageously be blended with simple alkyl diesters of aliphatic dibasic acids. Preferred starting materials are $C_8$ and $C_9$ alcohols, preferably branched chain, such as 2-ethyl hexanol, iso-octanol and $C_8$ and $C_9$ oxo alcohols, sebacic and adipic acids and polyethylene glycols up to and including hexa-ethylene glycol.

The preparation of these complex esters may be carried out by esterification in one or more stages, e. g., by the simultaneous reaction of stoichiometric proportions of the reactants, or by the preparation of the glycol half ester or the alcohol half ester and subsequent reaction with the alcohol or glycol respectively. Conventional catalysts may be used, such as toluene sulphonic acid, but a preferred catalyst is sodium bisulphate.

Members of this class, within the preferred range, are particularly suitable for use as lubricants, especially for aircraft engines of the prop-jet type. It has been found, however, that for good results the acidity of the ester should be low, preferably not more than 0.1 mg. KOH per gram.

Use of the conventional method of acidity reduction by washing with aqueous alkali such as the hydroxides or carbonates of sodium or potassium, followed by water washing, tends to give emulsions of a particularly refractory nature when applied to complex esters of this class.

In general, complex esters of the type described for use as lubricants should be stripped of volatile products after manufacture, e. g. by heating under vacuum, and it is desirable that this should be carried out before the alkali and water washing, since otherwise undesirable acidity increases occur while stripping the washed product.

This embodiment of the invention will be illustrated with reference to a complex ester prepared from sebacic acid, commercial "Polyglycol 200" and 2-ethyl hexanol. The procedure is as follows. In a first stage one mole of the polyglycol is esterified with two moles of sebacic acid, using sodium bisulphate as a catalyst (about 0.2% based on the acid) and a light petroleum fraction as a water entrainer. The esterification is continued until some 95% of the theoretical water has been removed, the temperature of the reactants ranging from about 120° to 180° C. To the glycol half ester product, 2.4 moles of 2-ethyl hexanol are added and heating is continued until practically all the theoretical water has been removed. This involves a liquid temperature from 135°-220° C. The complex ester product is then heated under a vacuum of about 20 mm. mercury absolute until the vapour temperature is about 230°-235° C. to remove volatile contaminants.

Comparative washing tests were carried out on a batch of crude complex ester prepared as described and having an acidity equivalent to 1.5 mg. KOH per gram. One volume of the ester, alone and after dilution with an equal volume of various solvents, was shaken at room temperature with one volume of 10% aqueous sodium carbonate. The time for phase separation was noted and the recovered ester layer was then shaken with water in two stages, using in each stage a volume of water equal to half the volume of ester originally taken. The times required for phase separation were noted at each stage and are recorded in the following Table 1:

TABLE 1

| Solvent | Time for phase separation of— | | | Final acidity mg. KOH/gm. |
|---|---|---|---|---|
| | Soda wash | 1st water wash | 2nd water wash | |
| None | Over 70 hours | | | |
| Benzene | Over 18 hours | | | |
| Isopropanol | 15 mins | Over 2 hours 30 mins | Over 50 hours 90 mins | |
| Methylal | do | | | 0.06 |

From this table it is clear that methylal is outstanding in assisting phase separation, especially in the water washing stages when particularly refractory emulsions are formed.

The effect of varying the amounts of methylal solvent used is shown in Table 2. The procedure was the same as that already described with reference to Table 1:

TABLE 2

| Vols. methylal per vol. ester | Time for phase separation of— | | | Final acidity mg. KOH/gm. |
|---|---|---|---|---|
| | Soda wash | 1st water wash | 2nd water wash | |
| 0.5 | 165 mins | Over 19 hours | | |
| 0.75 | 88 mins | 40 mins | Over 105 mins | 0.04 |
| 1.0 | 15 mins | 30 mins | 90 mins | 0.06 |
| 1.5 | 13 mins | 23 mins | 32 mins | 0.05 |
| 2 | 35 mins | 44 mins | 12 mins | 0.08 |

From this table it will be seen that optimum results are obtained somewhere between 1 and 1.5 vols. of methylal per vol. of ester. Owing to the volatility of the methylal there is a tendency for losses to occur, and for this reason it is desirable to use the smallest quantity compatible with good results. A convenient figure, as already stated, is equal volumes of methylal and complex ester.

While a batch process has been described, it will be clear that the process of the present invention can be modified to continuous operation, e. g., by countercurrent contacting of the ester with the soda solution and then with the water in conventional apparatus, with suitable control of flow rates and contacting time to ensure the desired degree of acidity reduction and appropriate speed of phase separation.

Thus to summarise, the present invention provides a process in which an organic ester is washed with aqueous alkali, and in which emulsion difficulties both in the alkali washing stage and in any further water washing stages are reduced by carrying out the washing in the presence of methylal.

While any esters derived from organic carboxylic acids and hydroxy compounds may be subjected to the treatment of the invention, the preferred materials are simple and complex esters derived from aliphatic monocarboxylic acids, aliphatic dicarboxylic acids, monohydric aliphatic alcohols and polyhydric aliphatic alcohols. Examples of simple esters are the isopropyl oleate, octyl sebacate and octyl stearate already mentioned but examples of other starting materials are alcohols such as the $C_1$ to $C_{20}$ alkanols both straight and branched chain, alkylene glycols and polyalkylene glycols, alkylene glycol monoalkyl ethers, mixed alcohols such as diacetone alcohol, cyclic alcohols such as furfuryl and tetrahydrofurfuryl alcohols, and polyhydric alcohols such as glycerol, sorbitol, sorbitan and pentaerythritol. The process is applicable both to full and partial esters of the polyhydric alcohols. Examples of suitable acids are the simple monocarboxylic alkanoic acids, for example having from 2 to 24 carbon atoms in the molecule, unsaturated acids such as oleic, ricinoleic, linolenic acids etc., dicarboxylic acids of the polymethylene series, aromatic acids such as benzoic and salicylic acids and many others.

The invention also provides an improved method for the preparation of simple and complex esters of the character described having reduced acidity which comprises esterifying the initial acidic and alcoholic reactants, washing the resultant crude ester with aqueous alkali in the presence of methylal, further washing the ester at least once with plain water and separating the resultant washed ester from any residual methylal. This may generally conveniently be done by simple distillation due to the low boiling point of methylal.

I claim:

1. In a process for the preparation of organic esters of reduced acidity which comprises esterifying aliphatic alcohols with carboxylic acids, the improvement which comprises washing the resultant crude ester with an aqueous alkali in the presence of methylal, further washing the ester at least once with water, and separating the ester from any residual methylal.

2. In a process for the preparation of organic esters of reduced acidity which comprises esterifying aliphatic alcohols with carboxylic acids, the improvement which comprises washing the resultant crude ester with an aqueous alkali in the presence of from ¾ to 2 volumes of methylal, based on the volume of the crude ester, further washing the ester at least once with water, and separating the ester from any residual methylal.

3. In a process for the preparation of organic esters of reduced acidity which comprises esterifying aliphatic alcohols with carboxylic acids, the improvement which comprises washing the resultant crude ester with an aqueous alkali in the presence of from ¾ to 2 volumes of methylal, based on the volume of the crude ester, at a temperature within the range of from 10° C. to 30° C., further washing the ester at least once with water, and separating the ester from any residual methylal.

4. In a process for the preparation of organic esters of reduced acidity which comprises esterifying aliphatic alcohols with carboxylic acids, the improvement which comprises washing the resultant crude with an equal volume of an aqueous sodium carbonate solution of about 7.5% to 10% concentration, in the presence of an equal volume of methylal, both the amount of sodium carbonate and the amount of methylal being based on the volume of the ester, at a temperature within the range of from 20° C. to 25° C., further washing the ester at least once with water, and separating the ester from any residual methylal.

5. A process according to claim 4 wherein said organic ester is the ester formed by esterifying an aliphatic alcohol with a monocarboxylic acid.

6. A process according to claim 4 wherein said organic ester is a complex ester formed by reacting together one mol proportion of a glycol with two molar porportions of a half ester of a dicarboxylic acid and an aliphatic alcohol.

IAN A. M. FORD.

References Cited in the file of this patent

FOREIGN PATENTS

| Number | Country | Date |
|--------|---------|------|
| 673,703 | France | Jan. 18, 1930 |

OTHER REFERENCES

Espie, Bull. Soc. Chim. (France), 5th series, vol. I, Part I, pp. 1502-3 (1934).